US012747149B2

(12) United States Patent
Srote et al.

(10) Patent No.: US 12,747,149 B2
(45) Date of Patent: Sep. 29, 2026

(54) CONTAINER FOR HUMAN CONSUMABLES

(71) Applicant: Wolfpack Partners LLC, Brentwood, MO (US)

(72) Inventors: Jordan Srote, Brentwood, MO (US); Marc Mazzie, Los Angeles, CA (US); Adam Clark, Ballwin, MO (US); Richard Longman, Boca Raton, FL (US)

(73) Assignee: Wolfpack Partners LLC, Brentwood, MO (US)

( * ) Notice: Subject to any disclaimer, the term of this patent is extended or adjusted under 35 U.S.C. 154(b) by 0 days.

(21) Appl. No.: 19/540,159

(22) Filed: Feb. 13, 2026

(65) Prior Publication Data

US 2026/0242200 A1 Aug. 20, 2026

Related U.S. Application Data

(60) Provisional application No. 63/759,288, filed on Feb. 17, 2025.

(51) Int. Cl.

| | |
|---|---|
| ***B67B 7/00*** | (2006.01) |
| ***B67B 7/16*** | (2006.01) |
| ***B67B 7/18*** | (2006.01) |
| ***B67B 7/40*** | (2006.01) |

(52) U.S. Cl.

CPC .................. *B67B 7/16* (2013.01); *B67B 7/18* (2013.01); *B67B 7/403* (2013.01)

(58) Field of Classification Search

CPC .......... B65D 51/28; B65D 2543/00629; B65D 2543/00537; B65D 2543/00092; B65D 43/1212; B65D 2215/02; B65D 2215/00; B65D 2209/00; B65D 2543/00296; B65D 2543/00555; B65D 2543/00685; B25F 1/00; B67B 7/44; B67B 7/16; A24F 23/00

USPC .................................................... 206/1.5, 473

See application file for complete search history.

(56) References Cited

U.S. PATENT DOCUMENTS

| | | | | |
|---|---|---|---|---|
| 10,463,075 B2 * | 11/2019 | Beardsall | ................ | A24F 23/00 |
| 2002/0175169 A1 * | 11/2002 | Tham-itthisak | .... | A47G 19/2205 220/694 |
| 2010/0307113 A1 * | 12/2010 | Bried | ...................... | A24F 23/00 53/415 |
| 2011/0107878 A1 * | 5/2011 | Gust | ......................... | B67B 7/16 206/265 |
| 2014/0238199 A1 * | 8/2014 | Bailey | ....................... | B67B 7/16 81/3.09 |

(Continued)

FOREIGN PATENT DOCUMENTS

EP 2956377 B1 4/2017

OTHER PUBLICATIONS https://www.alibaba.com/product-detail/Aluminum-Metal-Snuffbox-CNC-High-Precision_1601193038249.html?spm=a2700.galleryofferlist.normal_offer.d_title.2e7813a0HJTMNY, 6 pages.

(Continued)

*Primary Examiner* — King M Chu

(74) *Attorney, Agent, or Firm* — Stinson LLP

(57) ABSTRACT

A human consumables container, components thereof, and associated methods. The human consumables container can be used to hold consumables including (in loose or pouched form): snus, caffeine, nicotine, and/or smokeless tobacco. The human consumables container can include a bottle opener configured to remove a bottle cap from a bottle.

27 Claims, 8 Drawing Sheets

(56) References Cited

U.S. PATENT DOCUMENTS

| | | | | |
|---|---|---|---|---|
| 2015/0136618 | A1 | 5/2015 | Patel et al. | |
| 2022/0000175 | A1 * | 1/2022 | Patel | D21J 3/10 |

OTHER PUBLICATIONS https://chillcans.co/, 4 pages.
https://www.etsy.com/shop/ChillCans?ref=shop-header-name&listing_id=1558501180&from_page=listing, 7 pages.
https://icetool.com/en-us/, 10 pages.
https://www.etsy.com/shop/GunnerWoodworks?ref=shop-header-name&listing_id=1712829773&from_page=listing, 29 pages.

* cited by examiner

CONTAINER FOR HUMAN CONSUMABLES

CROSS-REFERENCE TO RELATED APPLICATION

This application claims priority to U.S. Provisional Patent Application No. 63/759,288, filed Feb. 17, 2025, the entirety of which is hereby incorporated by reference.

FIELD

The present disclosure relates to containers, and more particularly to human consumables containers.

BACKGROUND

Human consumables containers are used to hold human consumables such as oral consumables.

SUMMARY

In one aspect, a human consumables container for holding human consumables and for removing a bottle cap from a bottle comprises a housing body comprising a base and a cover. The base includes a bottom portion and an upstanding side wall. The cover includes an upper portion and a downwardly extending side wall. The upper portion defines an upper cavity. The cover and base are configurable in a connected seated configuration in which the side wall of the base and the side wall of the cover are mated to form a first compartment between the cover and the base and the cover is seated with respect to the base to prevent the cover moving closer toward the base. The first compartment is sized and shaped for holding human consumables therein. The base and cover are configured to define a fingernail gap between the base and cover when in the connected seated configuration to permit insertion of a fingernail of a user in the fingernail gap to facilitate separation of the cover from the base. At least one of the cover or the base includes surface irregularities defining a grip to facilitate gripping by a hand of a user for separating the cover from the base. The base comprises a bottle opener located to be outside of the first compartment when the cover and base are in the connected seated configuration. The bottle opener includes a recess sized to receive the bottle cap. The bottle opener includes a fulcrum and a prying portion configured to engage the bottle cap when the bottle cap is in the recess. The prying portion is located relative to the fulcrum to be received under the bottle cap and to pry the bottle cap off the bottle when the fulcrum is engaged with a top of the bottle cap and the housing body is pivoted relative to the bottle about the fulcrum. A lid includes an upper wall and a downwardly extending side wall. The lid and cover are configurable in a closed configuration in which the side wall of the lid is mated with the upper cavity of the cover to form a second compartment between the lid and the cover. The second compartment is above the first compartment. The upper compartment is sized and shaped for holding human consumables therein.

Other objects and features of the present disclosure will be in part apparent and in part pointed out herein.

BRIEF DESCRIPTION OF FIGURES

Corresponding reference characters indicate corresponding parts throughout the drawings.

DETAILED DESCRIPTION

The present disclosure is directed to a human consumables container, components thereof, and associated methods. For example without limitation, the container can be used to hold human consumables including (in loose or pouched form): snus, caffeine, nicotine, and/or smokeless tobacco. Such human consumables will generally be placed in the mouth of a user and consumed orally. The container can be used for holding other items (such as other human consumables, e.g., chewing gum, candy, etc.) without departing from the scope of the present disclosure.

Figure 1:
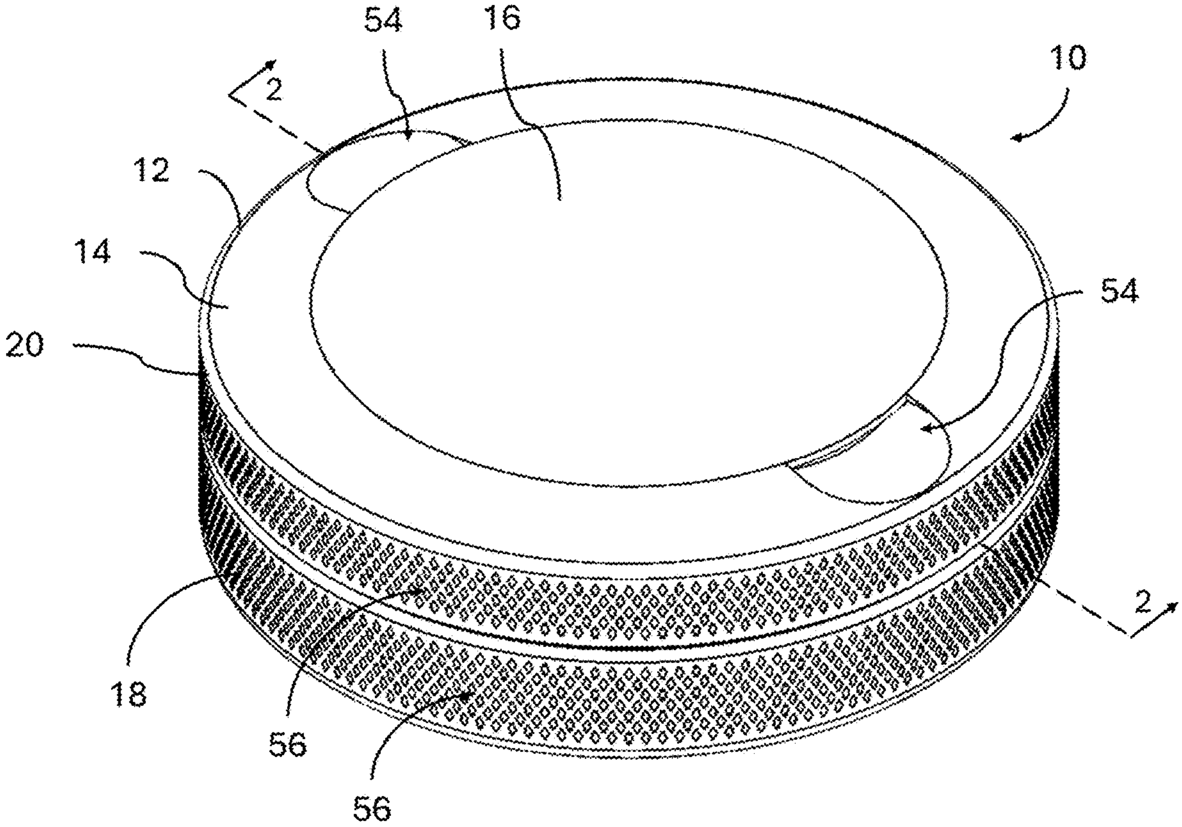
FIG. 1 is an isometric view of a container according to an embodiment of the present disclosure.

FIG. 1 is an isometric view of an example container of the present disclosure, which is indicated generally by the reference number 10. The container 10 includes a housing 12. The housing 12 has a housing body 14 and a lid 16. The housing body 14 includes a base 18 (e.g., lower (first) housing portion) and a cover 20 (e.g., second (upper) housing portion). In the illustrated embodiment, the housing 12 (e.g., housing body 14) has a generally cylindrical shape. Components of the housing 12 can be formed of anodized aluminum and/or another suitable material. For example, components of the housing 12 can be formed by CNC machining (e.g., CNC milling) aluminum. Other housing configurations and materials can be used without departing from the scope of the present disclosure.

Figure 2:
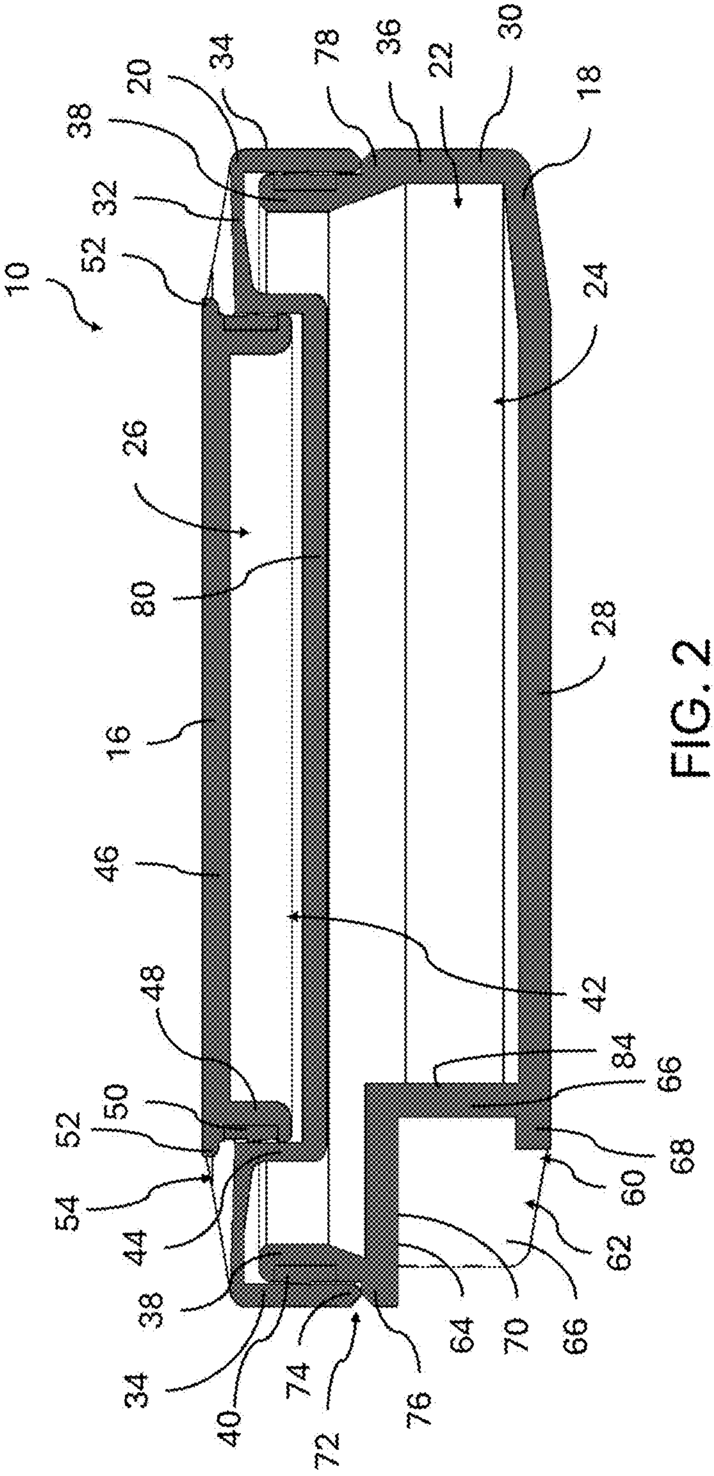
FIG. 2 is a cross-sectional view of the container taken along line 2-2 in FIG. 1.

FIG. 2 is a cross-sectional view of the container 10 taken along line 2-2 in FIG. 1. The housing components cooperate to form an interior 22 including multiple compartments. The interior 22 of the housing 12 includes a lower (first) compartment 24 and an upper (second) compartment 26. For example, the lower compartment 24 can be used to hold a supply of unused (e.g., new or fresh) human consumables, and the upper compartment 26 can be used to hold used human consumables. In one example, unused snus pouches are held in the lower compartment 24, and used snus pouches are held in the upper compartment 26.

The cover 20 is selectively connectable to the base 18 to selectively form the lower compartment 24. The base 18 includes a bottom portion 28 (e.g., bottom wall) and an upstanding cylindrical side wall 30. The cover 20 includes an upper portion 32 (e.g., upper wall) and a downwardly extending cylindrical side wall 34. The cylindrical side walls 30, 34 mate to form a connection between the base 18 and cover 20. In the illustrated embodiment, the side wall 30 of the base 18 includes a lower portion 36 and an upper connection portion 38. The side wall 34 of the cover 20 is sized to fit over the upper connection portion 38 of the base 18 to form a mating connection. Desirably, the mating connection includes a seal 40 for forming a liquid tight seal between the base 18 and cover 20. In the illustrated embodiment, the seal 40 comprises a gasket carried by the upper connection portion 38 of the base 18. The gasket is resiliently deformable to form a sealing friction fit with the cover 20 when the cover 20 is mated with the base 18 in the connected seated configuration. The seal 40 assists to prevent ingress and egress of moisture, contains the consumables in a fresh manner, and prevents odors from escaping. When the base 18 is mated to the cover 20, the components are in a connected seated configuration. Other configurations can be used without departing from the scope of the present disclosure.

Figure 3:
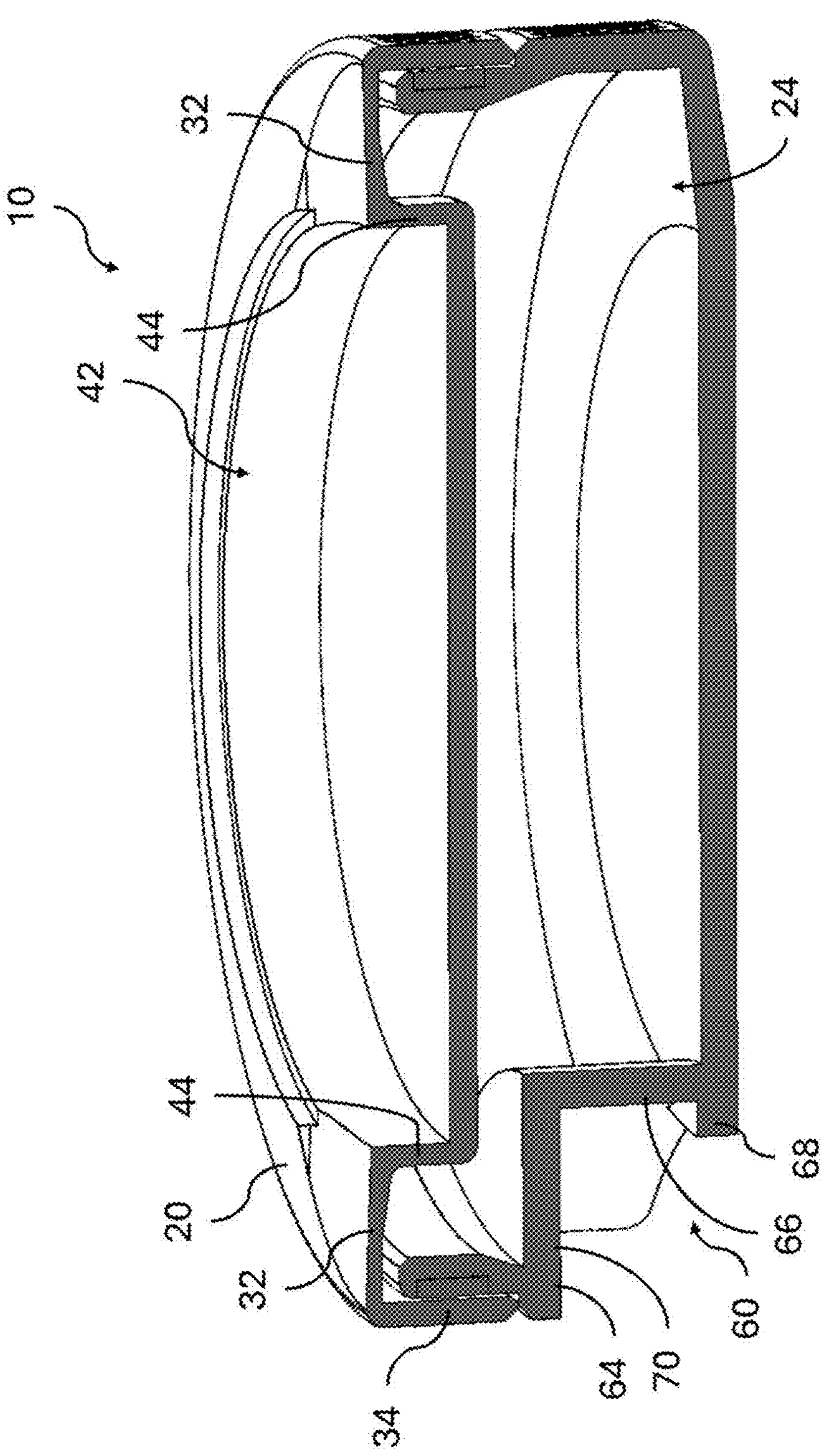
FIG. 3 is a cross-sectional view of the container taken along line 2-2 in FIG. 1 with a lid of the container removed.

The lid 16 is selectively connectable to the cover 20 to form the upper compartment 26. FIG. 3 is a cross-sectional view of the container 10 taken along line 2-2 in FIG. 1 with the lid 16 removed. The upper wall 32 of the cover 20 defines a cavity 42 (e.g., an upper cavity) bounded by a peripheral side wall 44. The peripheral side wall 44 is radially interior of, and spaced apart from, the downwardly extending side wall 34 of the cover 20. The peripheral side wall 44 may be referred to as an inner side wall, and the cylindrical side wall 34 may be referred to as an outer side wall. The lid 16 is selectively receivable in the cavity 42 to close the cavity 42 to form (e.g., enclose) the upper compartment 26, shown in FIG. 2.

With reference to FIG. 2, the lid 16 includes an upper wall 46 and a downwardly extending side wall 48 sized to fit in the cavity 42 to form a mating connection with the peripheral side wall 44. When the side wall 48 is received within the cavity 42, the lid 16 is mated with the cover 20, forming a closed configuration. In the closed configuration, the cavity 42 is enclosed by the upper wall 46 of the lid 16 to define the upper compartment 26. In the illustrated embodiment, the side wall 48 is cylindrical. Desirably, the mating connection includes a seal 50 for forming a liquid tight seal between the cover 20 and the lid 16. In the illustrated embodiment, the seal 50 comprises a gasket carried by the cylindrical side wall 48 of the lid 16. The gasket is resiliently deformable to form a sealing friction fit with the cover 20 when the lid 16 is mated with the cover 20 in the closed configuration. The seal 50 assists to prevent moisture ingress and egress, and odor egress, relative to the upper compartment 26. Other configurations can be used without departing from the scope of the present disclosure.

The upper compartment 26 is disposed above the lower compartment 24. The cover 20 includes a base wall 80 that forms a bottom of the cavity 42. The base wall 80 and the peripheral side wall 44 of the cover 20 separate the upper and lower compartments 26, 24 from one another. The upper compartment 26 is sized and shaped for holding human consumables therein. In an embodiment, the upper compartment 26 has less volume than the lower compartment 24. For example, the upper compartment 26 may be shallower than the lower compartment 24 and may have a reduced length dimension (e.g., diameter) as compared to the lower compartment 24.

Figure 4:
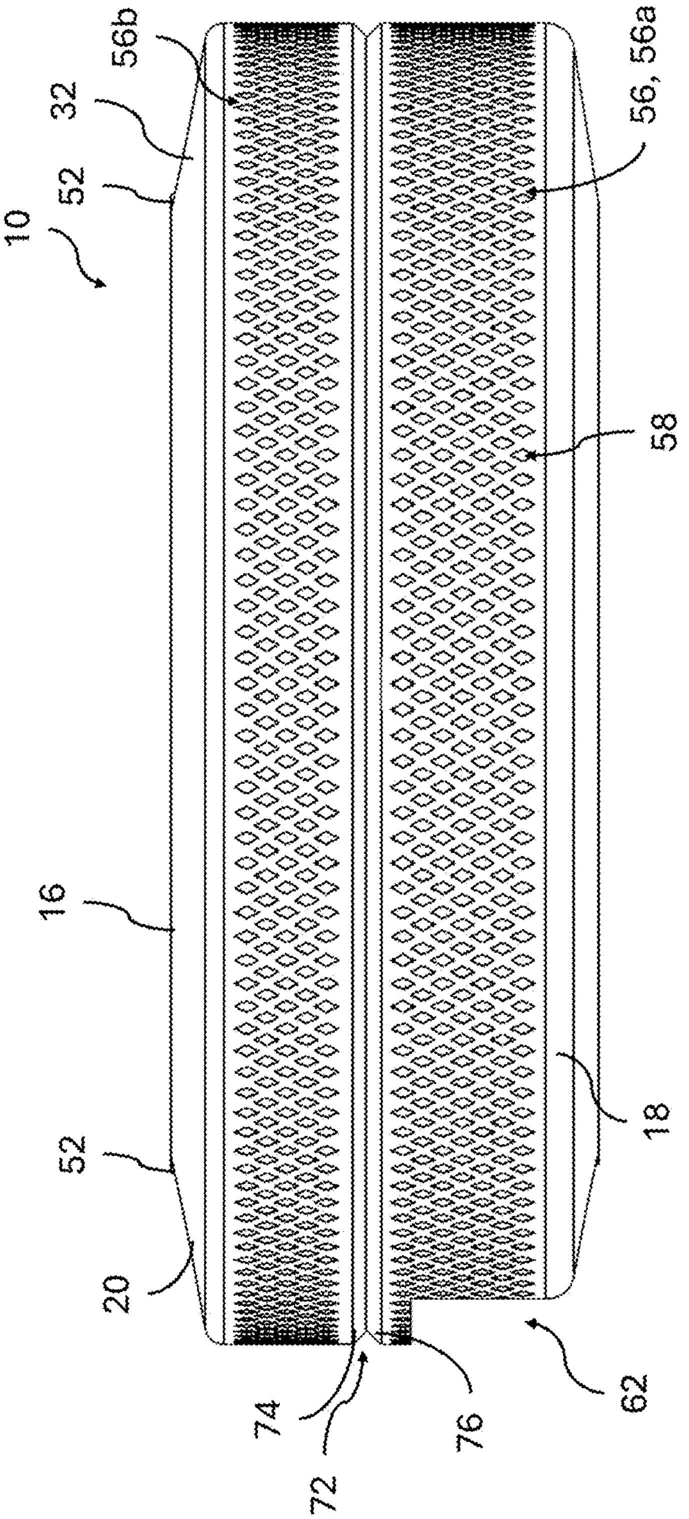
FIG. 4 is a front view of the container.
Figure 5:
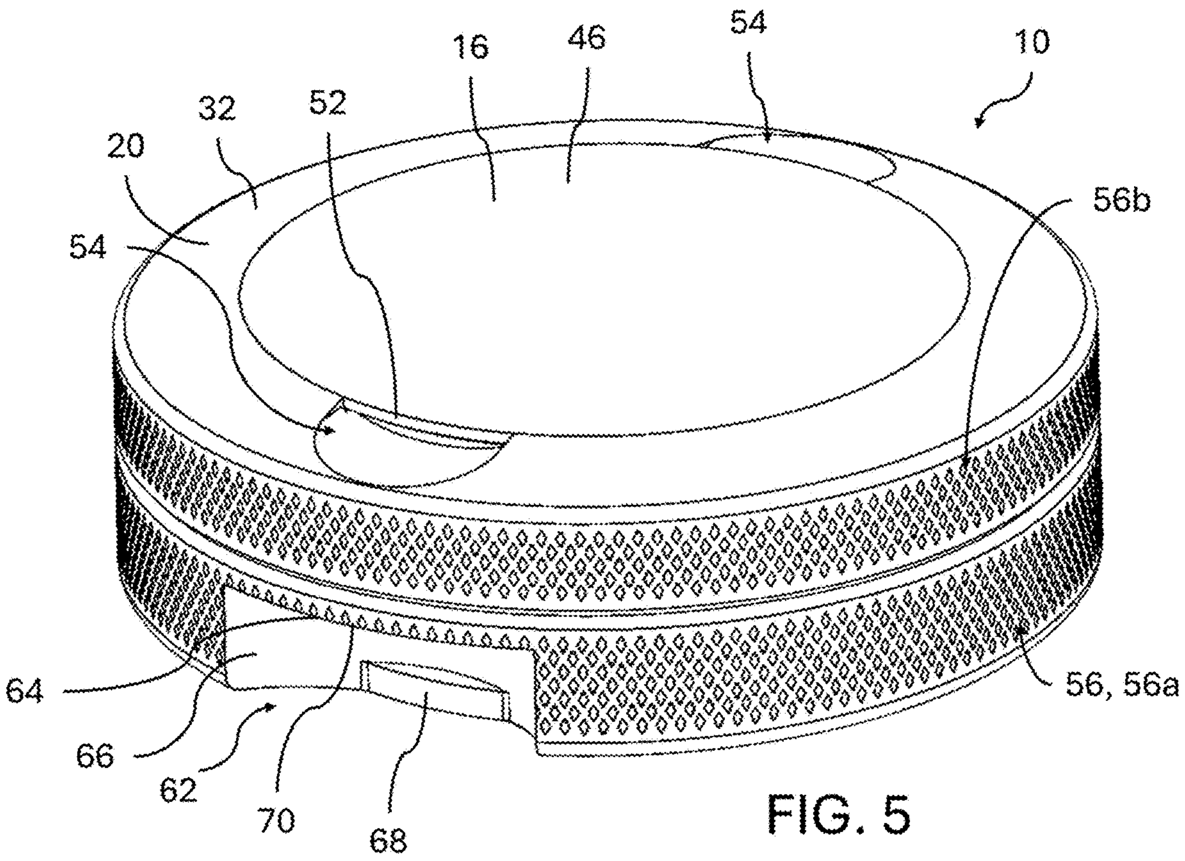
FIG. 5 is a second isometric view of the container.
Figure 6:
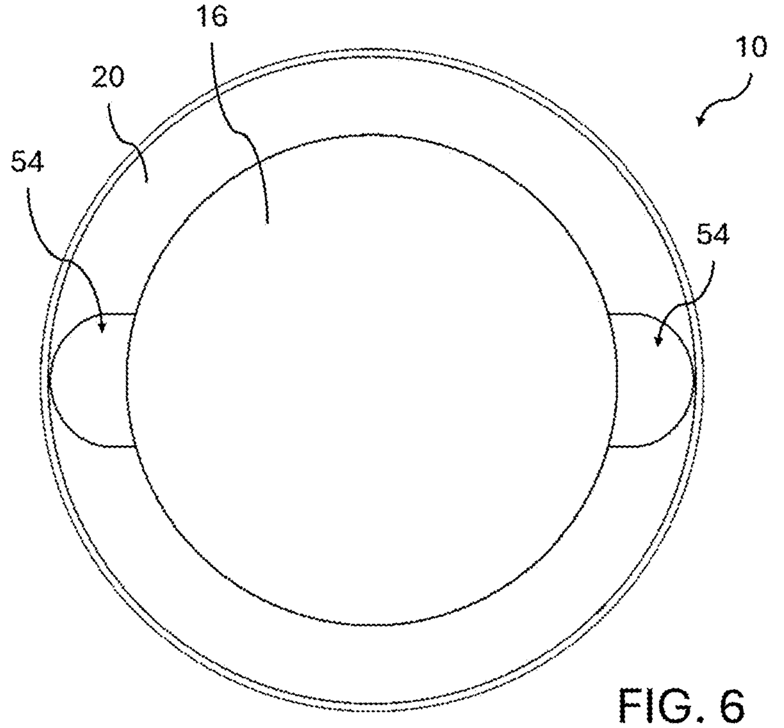
FIG. 6 is a top-down view of the container.

FIG. 4 is a front view of the container 10. FIG. 5 is a second isometric view of the container 10. FIG. 6 is a top-down view of the container 10. As shown in FIGS. 1, 2, and 4-6, when the lid 16 is fully seated in the cover 20, the upper wall 46 of the lid 16 is relatively flush with the top of the cover 20 (e.g., the upper portion 32). The lid 16 includes a flange 52 to assist the user in removing the lid 16 from the cover 20. The flange 52 is radially (e.g., laterally) extending. The cover 20 includes two recesses 54 permitting the user to locate their finger (e.g., fingernail) under the flange 52 to pull the lid 16 from the cover 20 to open the upper compartment 26. Each of the recesses 54 underlie the flange 52 when the lid 16 and the cover 20 are in the closed configuration. The recesses 54 are each sized and shaped to permit the fingernail of the user to be received within the recess 54 and pass under the flange 52. Other configurations can be used without departing from the scope of the present disclosure.

Desirably, the housing 12 is configured to permit convenient opening of the lower compartment 24 (shown in FIGS. 2 and 3). In a first aspect, the base 18 and cover 20 include grips facilitating a human hand in gripping the base 18 and cover 20 for separating the cover 20 from the base 18 to open the lower compartment 24. In general, the grips comprise surface irregularities (e.g., discontinuities). In the illustrated embodiment, the surface irregularities comprise knurling 56 on both the base 18 and the cover 20. The knurling 56 includes a lower knurling **56*a* (e.g., annular band of knurling) extending around the side wall 30 of the base 18 and an upper knurling 56*b* (e.g., annular band of knurling) extending around the side wall 34 of the cover 20. It will be appreciated that the knurling 56 can comprise a plurality of protrusions and recesses that when engaged by a hand of a user (e.g., fingertip thereof) provide increased friction compared to a smooth wall. For example, the user may engage the upper knurling 56*b* with a first hand, engage the lower knurling 56*a* with a second hand, and pull the cover 20 away from the base 18 to separate the cover 20 and base 18. For example, the knurling 56 can be formed by embossing exterior surfaces of the side walls 30, 34 of the base 18 and cover 20. It will be appreciated that other types of surface discontinuities can be used without departing from the scope of the present disclosure. Moreover, it will be appreciated that such surface discontinuities can be omitted (e.g., on one or both of the base 18 or cover 20**).

In the illustrated example, shown for example in FIG. 4, the knurling 56 comprises a plurality of cavities 58 (e.g., small recesses) creating a textured grip. The cavities 58 are provided in a pattern in which there are successive diagonal rows of recesses forming the annular band of knurling 56. The cavities 58 can be formed by embossing the outside surface of the housing 12 to push the material inward. Other patterns of cavities 58 can be used without departing from the scope of the present disclosure. Moreover, other types of knurling (broadly, texturing) can be used without departing from the scope of the present disclosure. For example, the texturing can comprise a plurality of protrusions.

In another aspect, the housing 12 is configured to permit easy disconnection of the cover 20 from the base 18 by providing a gap 72 between the base 18 and cover 20 when the base 18 and cover 20 are connected, as shown in FIGS. 2 and 4. For example, the base 18 and cover 20 include respective lips 74, 76 configured to define a gap 72 therebetween when the base 18 and cover 20 are mated (e.g., are in the connected seated configuration). The lips 74, 76 may engage each other in the connected seated configuration. In the illustrated embodiment, the lip 74 of the cover 20 is defined by a lower rim of the side wall 34, and the lip 76 of the base 18 is defined by a shoulder 78 of the side wall 30. The shoulder 78 is located at the interface between the lower portion 36 and the upper connection portion 38 of the side wall 30. When the cover 20 is mated on the base 18, the lower rim of the side wall 34 of the cover 20 is seated on the shoulder 78 of the side wall 30. The shoulder 78 provides a hard stop surface that prevents the cover 20 from moving closer toward the base 18. The gap 72 extends around the side of the container 10 and permits a user to insert one or more fingernails to assist in separating the cover 20 from the base 18 to access the lower compartment 24. For example, the fingernails can be used to pull the cover 20 upward while the user grips the knurling 56 of the base 18. The gap 72 is also referred to as a fingernail gap. The gap 72 may circumferentially extend around a full perimeter of the housing body 14.

Figure 7:
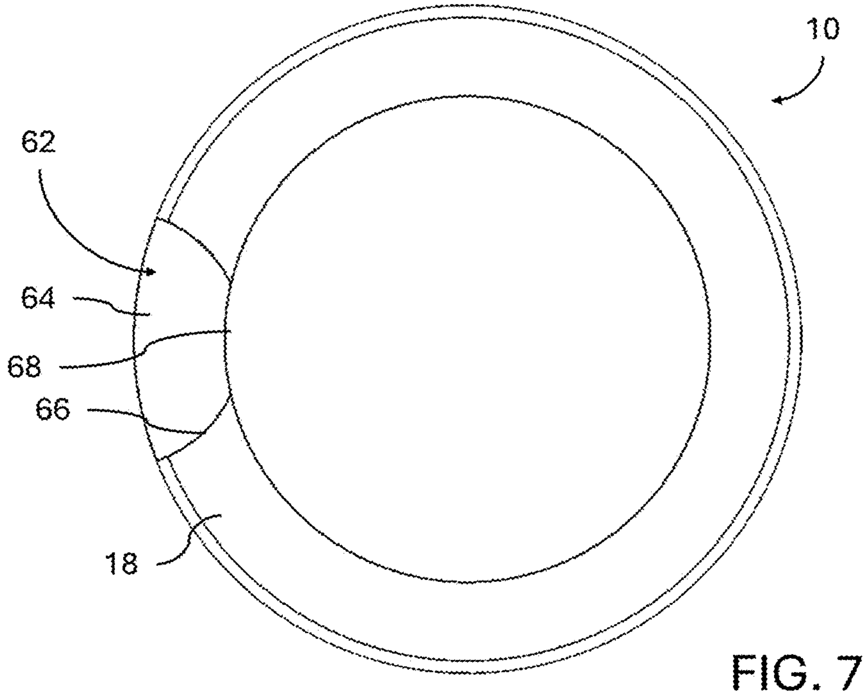
FIG. 7 is a bottom-up view of the container.
Figure 8:
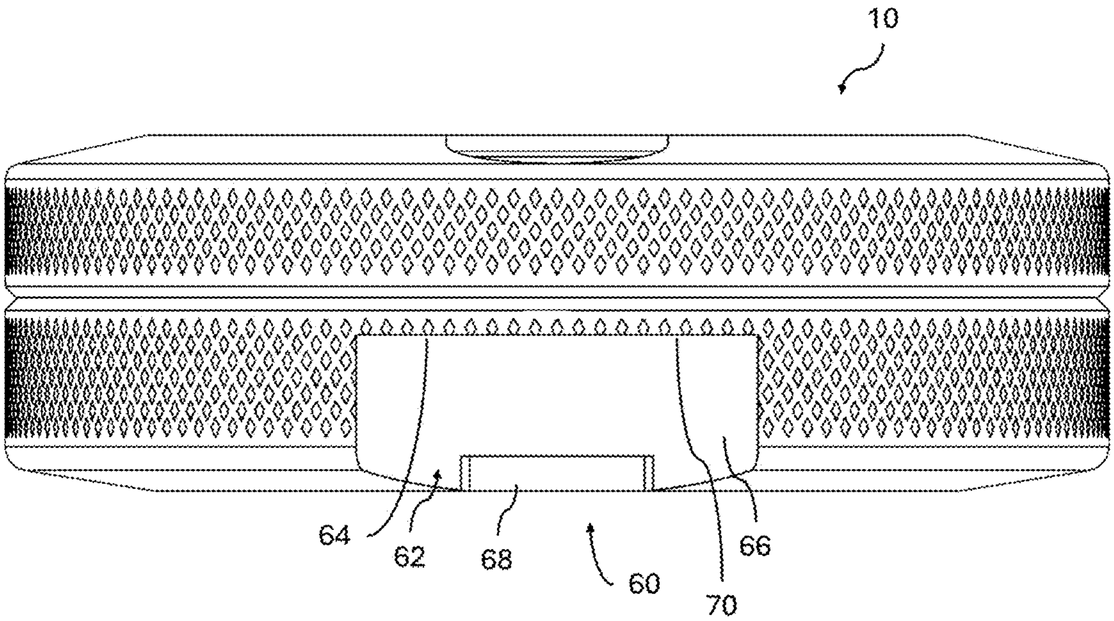
FIG. 8 is a left side view of the container, showing a bottle opener.
Figure 9:
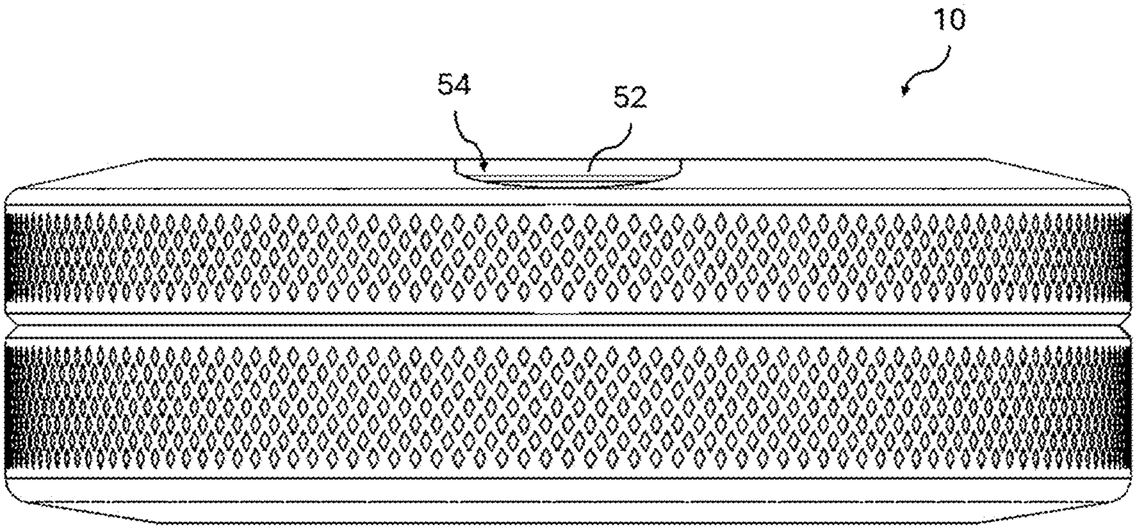
FIG. 9 is a right side view of the container.
Figure 10:
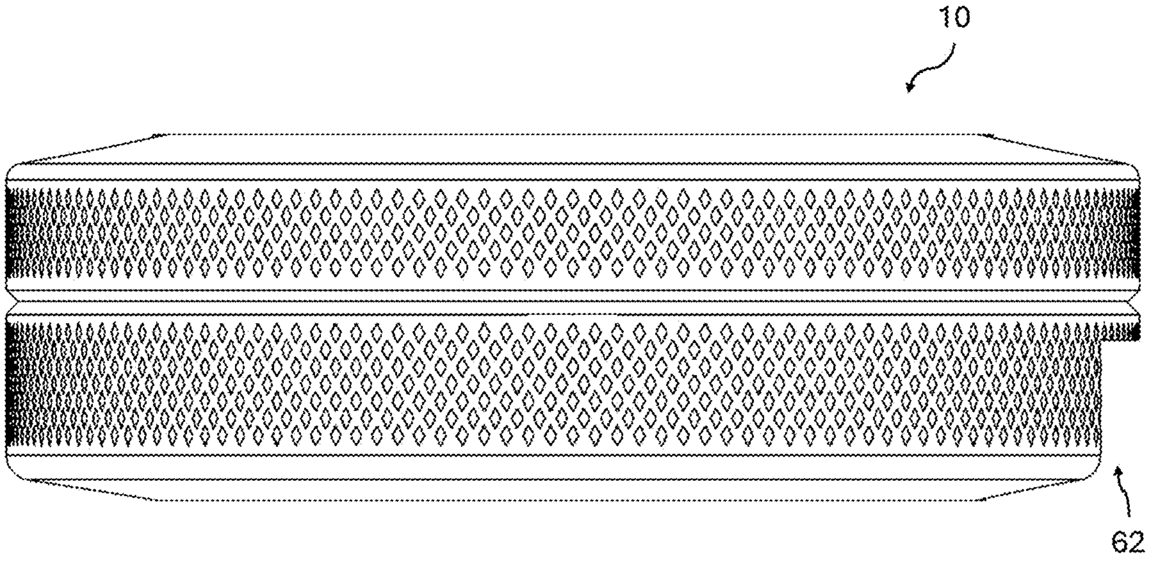
FIG. 10 is rear view of the container.

Desirably, the human consumables container 10 is a multi-function container. In the illustrated embodiment, the container 10 includes a bottle opener 60. The bottle opener 60 is integrated with the base 18 of the housing 12. FIG. 7 is a bottom-up view of the container 10. FIG. 8 is a left side view of the container 10, showing the bottle opener 60. With reference to FIGS. 2, 3, 5, 7, and 8, the housing 12 is formed to provide a recess 62 on a lower end thereof sized to receive a portion of a bottle cap therein. The recess 62 opens out of a bottom of the bottom portion 28 of the base 18. In the illustrated embodiment, as shown in FIGS. 2-4, the recess 62 also opens out of a side of the base 18, as a portion of the upstanding side wall 30 is effectively cut away to define the recess 62. The recess 62 opens out of the side of the base 18 to permit reception of the bottle cap in the recess 62 laterally from the side of the base 18 for removal of the bottle cap.

The recess 62 is bounded by an upper wall 64 and an arcuate side wall 66. The recess 62 is outside of the lower compartment 24. The bottle opener 60 is accessible for use when the cover 20 and base 18 are in the connected seated configuration. Optionally, the bottle opener 60 may also be operable when the cover 20 is separated from the base 18, such that the user holds the base 18 alone. The bottle opener 60 forms a protrusion 84 that protrudes into an interior of the lower compartment 24, as shown in FIGS. 2 and 3. The recess 62 of the bottle opener 60 extends in the protrusion 84. For example, the protrusion 84 is defined by the upper wall 64 and the arcuate side wall 66.

The bottle opener 60 includes a prying portion 68 and a fulcrum 70 (broadly, "bottle cap engagement portions"). In the illustrated embodiment the prying portion 68 is formed by a lug (at least one lug), and the fulcrum 70 is formed by a segment of the upper wall. The lug protrudes from the arcuate side wall 66 into the recess 62. For example, the lug radially (e.g., laterally) protrudes into the recess 62. In use, a user can manipulate the container 10 to locate a side portion of a bottle cap in the recess 62, with the prying portion 68 under a rim of the cap, and the fulcrum 70 on top of the cap. The user then moves the container 10 and/or bottle (e.g., pivots the container 10 relative to the bottle) to cause the prying portion 68 to pry the cap off the mouth of the bottle as the fulcrum 70 bears on the top of the cap. The housing 12 can be grasped by a user for use as a lever in pivoting the prying portion 68 about the fulcrum 70.

Other types and configurations of bottle openers can be used without departing from the scope of the present disclosure. For example, the prying portion 68 and/or fulcrum 70 could comprise two or more protrusions, or could comprise one protrusion, or no protrusions. Moreover, the container housing 12 could include material or structure connected to the housing body 14 and/or lid 16 that at least partially defines the prying and/or fulcrum portions. In an alternative embodiment, the bottle opener 60 can be omitted.

It is appreciated that the person of ordinary skill in the art is readily able to determine the scope of terms of degree such as, but not limited to, "about," "substantially," and "generally." For example, when a term of degree is used in relation to a numeric value, the person of ordinary skill in the art understands that the term of degree covers an inclusive range of plus or minus 10% of the numeric value, unless clearly indicated or stated otherwise.

When introducing elements of the present disclosure or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

Modifications and variations of the disclosed embodiments are possible without departing from the scope of the disclosure defined in the appended claims. For example, where specific dimensions are given, it will be understood that they are exemplary only and other dimensions are possible. As various changes could be made in the above constructions, products, and methods without departing from the scope of the disclosure, it is intended that all matter contained in the above description and shown in the accompanying drawings shall be interpreted as illustrative and not in a limiting sense.

What is claimed is:

1. A human consumables container for holding human consumables and for removing a bottle cap from a bottle, the human consumables container comprising:

a housing body comprising a base and a cover, the base including a bottom portion and an upstanding side wall, the cover including an upper portion and a downwardly extending side wall, the upper portion defining an upper cavity, the cover and base being configurable in a connected seated configuration in which the upstanding side wall of the base and the downwardly extending side wall of the cover are mated to form a first compartment between the cover and the base and the cover is seated with respect to the base to prevent the cover moving closer toward the base, the first compartment being sized and shaped for holding human consumables therein, the base and cover being configured to define a fingernail gap between the base and cover when in the connected seated configuration to permit insertion of a fingernail of a user in the fingernail gap to facilitate separation of the cover from the base, at least one of the cover or the base including surface irregularities defining a grip to facilitate gripping by a hand of a user for separating the cover from the base, the base comprising a bottle opener located to be outside of the first compartment when the cover and base are in the connected seated configuration, the bottle opener including a recess sized to receive the bottle cap, the recess open out of a side of the base to permit reception of the bottle cap in the recess laterally from the side of the base, the bottle opener including a fulcrum and a prying portion configured to engage the bottle cap when the bottle cap is in the recess, the prying portion being located relative to the fulcrum to be received under the bottle cap and to pry the bottle cap off the bottle when the fulcrum is engaged with a top of the bottle cap and the housing body is pivoted relative to the bottle about the fulcrum; and a lid including an upper wall and a downwardly extending side wall, the lid and cover being configurable in a closed configuration in which the downwardly extending side wall of the lid is mated with the upper cavity of the cover to form a second compartment between the lid and the cover, the second compartment being above the first compartment, the second compartment being sized and shaped for holding human consumables therein.

2. The human consumables container of claim 1, wherein the base comprises a protrusion protruding into an interior of the first compartment, the recess of the bottle opener extending in the protrusion.

3. The human consumables container of claim 2, wherein the prying portion comprises a lug protruding into the recess of the bottle opener.

4. The human consumables container of claim 1, wherein the recess of the bottle opener opens out of a bottom of the bottom portion of the base and opens out of the side of the base.

5. The human consumables container of claim 1, wherein the prying portion comprises a lug protruding laterally into the recess of the bottle opener.

6. The human consumables container of claim 1, wherein the recess of the bottle opener is bounded by a side wall from which the prying portion protrudes and is bounded by an upper wall.

7. The human consumables container of claim 1, wherein the downwardly extending side wall of the cover is sized to fit over the upstanding side wall of the base to configure the cover and the base in the connected seated configuration.

8. The human consumables container of claim 1, wherein the housing body has a generally cylindrical shape.

9. The human consumables container of claim 1, wherein the lid includes a laterally extending flange configured to permit a fingernail of a user to engage the flange to separate the lid from the cover.

10. The human consumables container of claim 9, wherein the cover includes a recess located to underlie the flange of the lid when the lid and cover are in the closed configuration, the recess of the cover being sized and shaped to permit the fingernail of the user to pass under the flange.

11. The human consumables container of claim 1, wherein:

the downwardly extending side wall of the cover is sized to fit over the upstanding side wall of the base to configure the cover and the base in the connected seated configuration;

the housing body has a generally cylindrical shape; and wherein the lid includes a laterally extending flange configured to permit a fingernail of a user to engage the flange to separate the lid from the cover.

12. The human consumables container of claim 11, wherein the fingernail gap extends circumferentially around the housing body.

13. The human consumables container of claim 11, wherein the base and cover include respective lips configured to engage each other in the connected seated configuration to define the fingernail gap between the base and cover, the lip of the cover being defined by a lower rim of the side wall of the cover, and the lip of the base being defined by a shoulder of the upstanding side wall of the base.

14. The human consumables container of claim 1, wherein the surface irregularities comprise knurling.

15. The human consumables container of claim 1, wherein the base and cover include respective lips configured to engage each other in the connected seated configuration to define the fingernail gap between the base and cover, the lip of the cover being defined by a lower rim of the side wall of the cover, and the lip of the base being defined by a shoulder of the upstanding side wall of the base.

16. The human consumables container of claim 1, wherein the surface irregularities comprise knurling defining a plurality of cavities.

17. The human consumables container of claim 1, wherein the lid includes a first resiliently deformable gasket configured to form a sealing friction fit with the cover in the closed configuration, and wherein the base includes a second resiliently deformable gasket configured to form a sealing friction fit with the cover in the connected seated configuration.

18. A human consumables container for holding human consumables and for removing a bottle cap from a bottle, the human consumables container comprising:

a housing body comprising a base and a cover, the base including a bottom portion and an upstanding side wall, the cover including an upper portion and a downwardly extending side wall, the upper portion defining an upper cavity, the cover and base being configurable in a connected seated configuration in which the upstanding side wall of the base and the downwardly extending side wall of the cover are mated to form a first compartment between the cover and the base and the cover is seated with respect to the base to prevent the cover moving closer toward the base, the first compartment being sized and shaped for holding human consumables therein, the base and cover being configured to define a fingernail gap between the base and cover when in the connected seated configuration to permit insertion of a fingernail of a user in the fingernail gap to facilitate separation of the cover from the base, at least one of the cover or the base including surface irregularities defining a grip to facilitate gripping by a hand of a user for separating the cover from the base, the base comprising a bottle opener located to be outside of the first compartment when the cover and base are in the connected seated configuration, the bottle opener including a recess sized to receive the bottle cap, the bottle opener including a fulcrum and a prying portion configured to engage the bottle cap when the bottle cap is in the recess, the prying portion being located relative to the fulcrum to be received under the bottle cap and to pry the bottle cap off the bottle when the fulcrum is engaged with a top of the bottle cap and the housing body is pivoted relative to the bottle about the fulcrum; and a lid including an upper wall and a downwardly extending side wall, the lid and cover being configurable in a closed configuration in which the downwardly extending side wall of the lid is mated with the upper cavity of the cover to form a second compartment between the lid and the cover, the second compartment being above the first compartment, the second compartment being sized and shaped for holding human consumables therein, wherein the base comprises a protrusion protruding into an interior of the first compartment, and the recess of the bottle opener extends in the protrusion.

19. The human consumables container of claim 18, wherein the recess of the bottle opener opens out of a side of the base.

20. The human consumables container of claim 19, wherein the recess of the bottle opener opens out of the side of the base and opens out of a bottom of the bottom portion of the base.

21. The human consumables container of claim 18, wherein the housing body has a generally cylindrical shape, and the fingernail gap extends circumferentially around the housing body.

22. A human consumables container for holding human consumables and for removing a bottle cap from a bottle, the human consumables container comprising:

a housing body comprising a base and a cover and having a generally cylindrical shape, the base including a bottom portion and an upstanding side wall, the cover including an upper portion and a downwardly extending side wall, the upper portion defining an upper cavity, the cover and base being configurable in a connected seated configuration in which the upstanding side wall of the base and the downwardly extending side wall of the cover are mated to form a first compartment between the cover and the base and the cover is seated with respect to the base to prevent the cover moving closer toward the base, the first compartment being sized and shaped for holding human consumables therein, the base and cover being configured to define a fingernail gap between the base and cover when in the connected seated configuration to permit insertion of a fingernail of a user in the fingernail gap to facilitate separation of the cover from the base, the fingernail gap extending circumferentially around the housing body, at least one of the cover or the base including surface irregularities defining a grip to facilitate gripping by a hand of a user for separating the cover from the base, the base comprising a bottle opener located to be outside of the first compartment when the cover and base are in the connected seated configuration, the bottle opener including a recess sized to receive the bottle cap, the bottle opener including a fulcrum and a prying portion configured to engage the bottle cap when the bottle cap is in the recess, the prying portion being located relative to the fulcrum to be received under the bottle cap and to pry the bottle cap off the bottle when the fulcrum is engaged with a top of the bottle cap and the housing body is pivoted relative to the bottle about the fulcrum; and a lid including an upper wall and a downwardly extending side wall, the lid and cover being configurable in a closed configuration in which the downwardly extending side wall of the lid is mated with the upper cavity of the cover to form a second compartment between the lid and the cover, the second compartment being above the first compartment, the second compartment being sized and shaped for holding human consumables therein.

23. The human consumables container of claim 22, wherein the base comprises a protrusion protruding into an interior of the first compartment, and the recess of the bottle opener extends in the protrusion.

24. The human consumables container of claim 22, wherein the recess of the bottle opener opens out of a side of the base.

25. A human consumables container for holding human consumables and for removing a bottle cap from a bottle, the human consumables container comprising:

a housing body comprising a base and a cover, the base including a bottom portion and an upstanding side wall, the cover including an upper portion and a downwardly extending side wall, the upper portion defining an upper cavity, the cover and base being configurable in a connected seated configuration in which the upstanding side wall of the base and the downwardly extending side wall of the cover are mated to form a first compartment between the cover and the base and the cover is seated with respect to the base to prevent the cover moving closer toward the base, the first compartment being sized and shaped for holding human consumables therein, the base and cover being configured to define a fingernail gap between the base and cover when in the connected seated configuration to permit insertion of a fingernail of a user in the fingernail gap to facilitate separation of the cover from the base, at least one of the cover or the base including surface irregularities defining a grip to facilitate gripping by a hand of a user for separating the cover from the base, the base comprising a bottle opener located to be outside of the first compartment when the cover and base are in the connected seated configuration, the bottle opener including a recess sized to receive the bottle cap, the bottle opener including a fulcrum and a prying portion configured to engage the bottle cap when the bottle cap is in the recess, the prying portion being located relative to the fulcrum to be received under the bottle cap and to pry the bottle cap off the bottle when the fulcrum is engaged with a top of the bottle cap and the housing body is pivoted relative to the bottle about the fulcrum; and a lid including an upper wall and a downwardly extending side wall, the lid and cover being configurable in a closed configuration in which the downwardly extending side wall of the lid is mated with the upper cavity of the cover to form a second compartment between the lid and the cover, the second compartment being above the first compartment, the second compartment being sized and shaped for holding human consumables therein, wherein the base and the cover include respective lips configured to engage each other in the connected seated configuration to define the fingernail gap between the base and cover, the lip of the cover being defined by a lower rim of the side wall of the cover, and the lip of the base being defined by a shoulder of the upstanding side wall of the base.

26. The human consumables container of claim 25, wherein the housing body has a generally cylindrical shape, and the fingernail gap extends circumferentially around the housing body.

27. The human consumables container of claim 25, wherein the recess of the bottle opener opens out of a bottom of the bottom portion of the base.

* * * * *